(12) United States Patent
Makins

(10) Patent No.: US 8,267,680 B2
(45) Date of Patent: Sep. 18, 2012

(54) MOLD HAVING MOLD TOOLING

(75) Inventor: James D. Makins, Greer, SC (US)

(73) Assignee: Michelin recherche et Technique S.A., Granges-Paccot (CH)

( * ) Notice: Subject to any disclaimer, the term of this patent is extended or adjusted under 35 U.S.C. 154(b) by 27 days.

(21) Appl. No.: 13/058,563

(22) PCT Filed: Aug. 12, 2008

(86) PCT No.: PCT/US2008/072852
§ 371 (c)(1),
(2), (4) Date: Feb. 11, 2011

(87) PCT Pub. No.: WO2010/019134
PCT Pub. Date: Feb. 18, 2010

(65) Prior Publication Data
US 2011/0129559 A1 Jun. 2, 2011

(51) Int. Cl.
B29C 33/30 (2006.01)
(52) U.S. Cl. ........................................................ 425/46
(58) Field of Classification Search ................. 425/28.1, 425/46
See application file for complete search history.

(56) References Cited

U.S. PATENT DOCUMENTS

| 1,604,034 | A |   | 10/1926 | Gillam et al. |       |
|-----------|---|---|---------|---------------|-------|
| 1,750,867 | A |   | 3/1930  | Smith et al.  |       |
| 2,031,561 | A |   | 2/1936  | Day           |       |
| 3,341,933 | A | * | 9/1967  | McPhaden et al. | 425/46 |
| 3,526,930 | A |   | 9/1970  | Rawls         |       |
| 3,682,576 | A | * | 8/1972  | Gross         | 425/46 |
| 3,999,907 | A |   | 12/1976 | Pappas        |       |
| 4,601,648 | A |   | 7/1986  | Amano et al.  |       |
| 4,726,749 | A |   | 2/1988  | Katsumata     |       |
| 5,120,209 | A | * | 6/1992  | MacMillan     | 425/46 |
| 5,234,326 | A | * | 8/1993  | Galli et al.  | 425/46 |
| 5,494,551 | A |   | 2/1996  | Stevens       |       |
| 5,601,850 | A |   | 2/1997  | Ureshino      |       |
| 5,653,847 | A |   | 8/1997  | King et al.   |       |
| 6,017,206 | A |   | 1/2000  | Soulalioux    |       |
| 6,382,943 | B1 | * | 5/2002  | Metz et al.  | 425/46 |
| 7,118,702 | B2 |   | 10/2006 | Marchadier et al. |   |
| 7,201,570 | B2 | * | 4/2007  | Ohara        | 425/46 |
| 2004/0046286 | A1 |   | 3/2004 | Seko et al.  |       |
| 2004/0137099 | A1 |   | 7/2004 | Oku et al.   |       |
| 2004/0207116 | A1 |   | 10/2004 | Girard et al. |      |

FOREIGN PATENT DOCUMENTS

| EP | 0955153 A2 | 11/1999 |
| JP | 2001-322132 | 11/2001 |
| WO | 2010019134 A1 | 2/2010 |

OTHER PUBLICATIONS

International Search Report and Written Opinion for PCT/US2008/072852 dated Dec. 3, 2008.
EP Patent Application No. 08819079.8; Extended European Search Report, dated Jan. 16, 2012 (6 pages).

* cited by examiner

Primary Examiner — James Mackey
(74) Attorney, Agent, or Firm — E. Martin Remick

(57) ABSTRACT

A tooling apparatus for attaching a mold sector to a mold back, the tooling apparatus comprising a frame, a clamping mechanism on the frame for securing the frame to the mold back, at least one fastener positioned on the frame for providing a clamping force to the clamping mechanism for fixing the frame in position on the mold back, a slide assembly slidably engaged with the frame, a biasing mechanism for positioning the slide assembly on the frame and an attaching mechanism for attaching the slide assembly to the mold sector.

22 Claims, 6 Drawing Sheets

MOLD HAVING MOLD TOOLING

BACKGROUND OF THE INVENTION

1. Field of the Invention

This invention relates generally to molding, and more specifically to methods and apparatus for molding tires.

2. Description of the Related Art

In the construction of pneumatic tires, various uncured tire components are assembled together sequentially around a tire building drum and shaped around the drum into the desired toroidal form of the tire. The shaped uncured tire is then cured for strength and durability. Tire molds are used in the curing process to give a tire its final shape and appearance and to vulcanize the components of the tire.

Tire molds for curing complete tires are generally of two types: clamshell molds and segmented molds. Clamshell molds are two piece molds where half of the tire is molded in one half of the mold and the other half of the tire is molded in the other half of the mold. Segmented molds are a plurality of sector shaped segments that move radially as depicted in FIG. 1. With each type of mold, heated exterior components of the mold are moved into contact with the tread and sidewall portions of the uncured tire and cure the tire from the outside. A heated bladder is inflated or core contacts the inner surface of the tire to shape and cure the tire from the inside.

In segmented molds, a mold back is a wedge shaped component used to support the mold sectors that form the tread portions of the tire as shown in FIGS. 1 and 2. Sector tooling provides the connection between the mold back and the mold sector. The purpose of the sector tooling is to position the mold sectors circumferentially around the mold. Sector tooling is affixed to the mold back using several screws or bolts. The mold sector is then placed on the sector tooling by sliding the mold sector onto the sector tooling and securing with more screws or bolts. This connection between the sector tooling and the mold back and the sector tooling and the mold sector makes exchanging the tread pattern or changing the size of the tire labor intensive and time consuming. This type of sector tooling design does not allow for the sector tooling to be repositioned to accommodate changing the number of tread sectors. Therefore, the mold is dedicated to a particular tire size.

SUMMARY OF THE INVENTION

Embodiments of the present invention provide an improved mold adaptable for producing tires of various sizes. An embodiment creates standardized parts that allow tire size and tread pattern changes with minimal down time to change mold components in the curing press.

An embodiment of the present invention includes a tooling apparatus for attaching a mold sector to a mold back. The tooling apparatus comprises a frame, a clamping mechanism on the frame for securing the frame to the mold back, at least one fastener positioned on the frame for providing a clamping force to the clamping mechanism for fixing the frame in position on the mold back, a slide assembly slidably engaged with the frame, a biasing mechanism for positioning the slide assembly on the frame and an attaching mechanism for attaching the slide assembly to the mold sector.

Another embodiment of the present invention includes a molding apparatus comprising a mold back, at least one circumferential groove in the mold back, a frame slidably engaged with the at least one groove on the mold back, a clamping mechanism for securing the frame to the mold back, at least one fastener positioned on the frame for providing a clamping force to the clamping mechanism for fixing the frame in position on the mold back, a slide assembly slidably engaged with the frame, a biasing mechanism for positioning the slide assembly with the frame and an attaching mechanism for attaching the slide assembly to a mold sector.

Yet another embodiment of the present invention includes a mold comprising a mold back, at least one circumferential groove in the mold back, a frame slidably engaged with the at least one groove on the mold back, a clamping mechanism for securing the frame to the mold back, at least one fastener positioned on the frame for providing a clamping force to the clamping mechanism for fixing the frame in position on the mold back to receive a mold sector, a slide assembly slidably engaged with the frame, a biasing mechanism for engaging the slide assembly with the frame, an attaching mechanism for attaching the slide assembly to a mold sector, a plurality of mold sectors, and a plurality of steps on each mold sector.

Still another embodiment of the present invention includes a method of making a tire using the tooling apparatus, the method comprising selecting a number of mold sectors needed for a specific tire size, positioning a plurality of tooling apparatus around a mold back to accommodate the number of mold sectors required for the tire size, fixing the position of the tooling apparatus to the mold back with a fastener, attaching the mold sectors on the tooling apparatus and locking the mold sector on the tooling apparatus.

The foregoing and other objects, features and advantages of the invention will be apparent from the following more detailed descriptions of particular embodiments of the invention, as illustrated in the accompanying drawings wherein like reference numbers represent like parts of the invention.

DETAILED DESCRIPTION OF PARTICULAR EMBODIMENTS

Particular embodiments of the present invention include an adaptable apparatus and methods for molding tires of various sizes. Two piece segmented molds include a top half and a bottom half that meet at an approximately axially centered parting line. The top half of the mold is capable of moving toward and away from the bottom half of the mold for loading and unloading tires.

Figure 1:
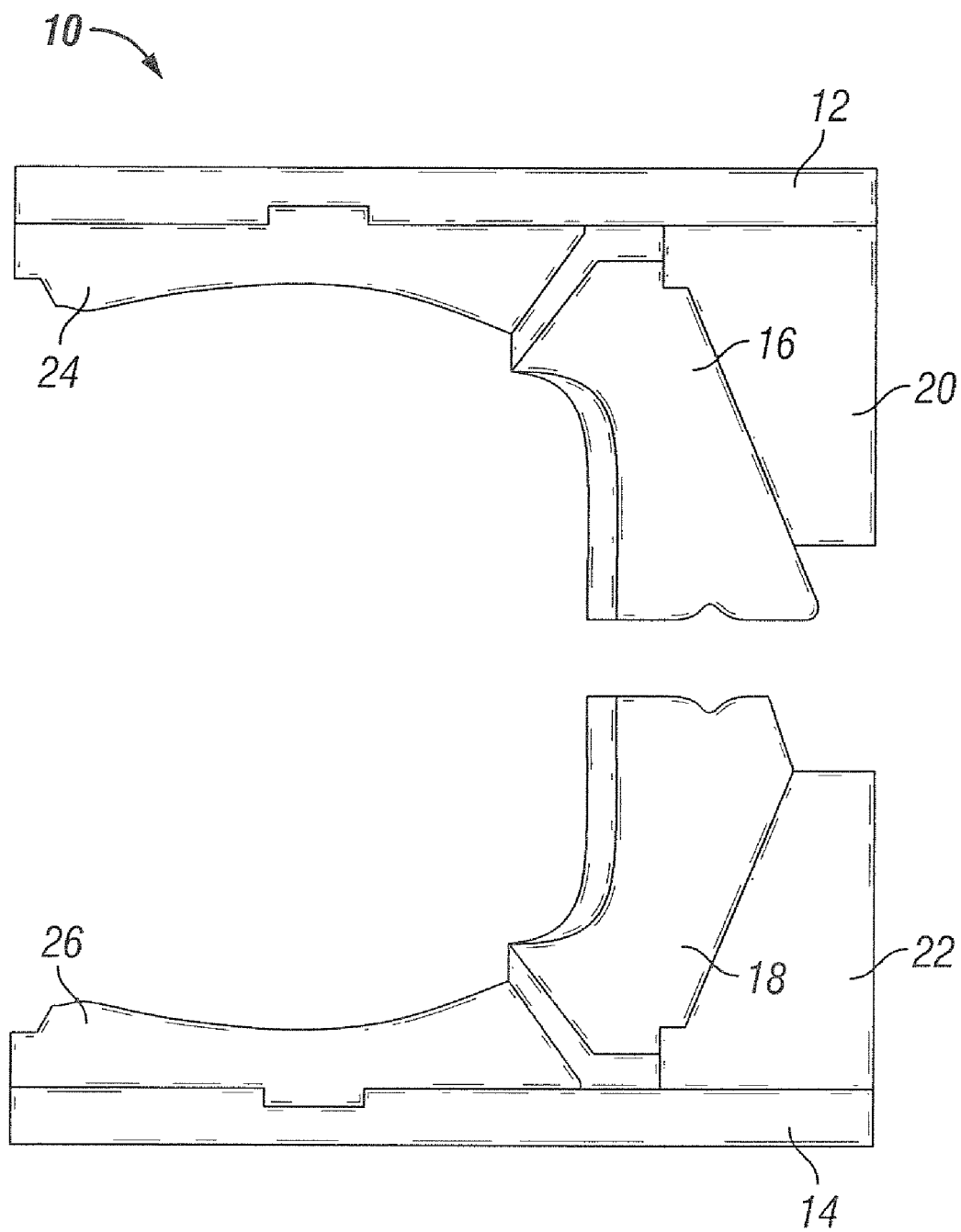
FIG. 1 is a partial section view of a two piece segmented tire mold according to the prior art.
Figure 2:
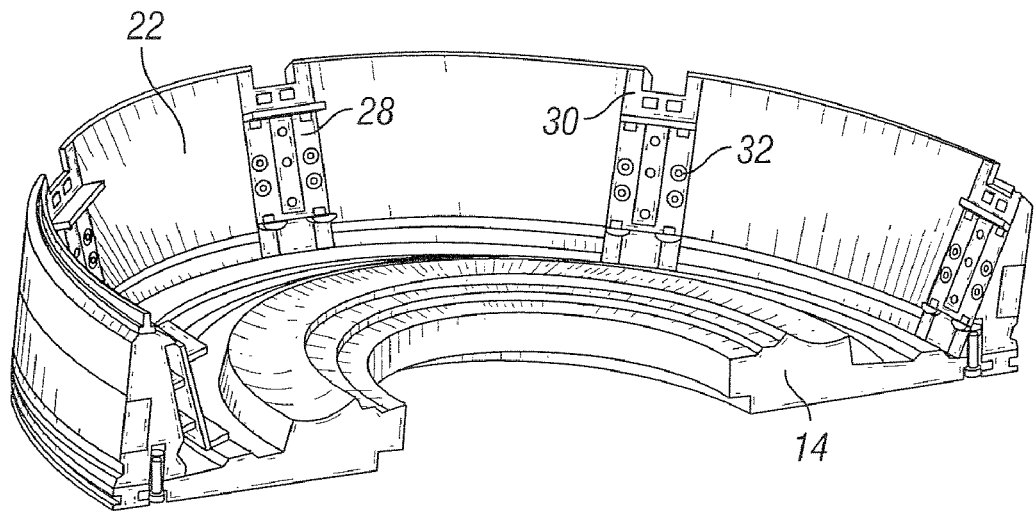
FIG. 2 is a partial section view of a tire mold illustrating the sector tooling as known in the prior art.

FIG. 1 illustrates a partial section view of a two piece segmented tire mold 10. The tire mold 10 includes an upper base plate 12 and a lower base plate 14. The upper base plate includes a top mold back 20 that forms a ring to support the other mold elements, a top side plate 24 that molds the side wall of the tire, and a plurality of tread mold sectors 16 movably mounted to the top mold back 20. The mold sectors 16 are mounted to the mold back 20 with sector tooling as shown in FIG. 2. The lower base plate 14 similarly includes a mold back 22, a bottom side plate 26, and a plurality of mold sectors 18. The base plates 12, 14 hold the sectors 16, 18 and the mold backs 20, 22 and the side plates 24, 26 together within the mold.

The lower base plate 14 provides the connection between the mold components and the curing press. The curing press provides the pressure and heat to the mold to induce vulcanization of the rubber. Different types of curing presses may be used such as, for example: McNeil, NRM, Kobe, Sanming, Krupp, Mitsubishi, etc. It will be known to those of ordinary skill in the art that the top half of the mold is a mirror image of the bottom half. Therefore, the following description may be applied to either the top half or bottom half of the mold.

The plurality of mold sectors 18 forms the tread pattern of the tire. The number of mold sectors required is a function of the tire circumference. For example, eight or nine sectors might be used to mold a small passenger car tire whereas ten or more sectors might be used to mold a large pickup truck or SUV tire. The mold sectors are mounted to the mold back using sector tooling.

FIG. 2 illustrates a section of the bottom half of the mold as known in the art. A mold sector 18 (as shown in FIG. 1) is attached to the mold back 22 using sector tooling 28. The sector tooling functions to hold the mold sector to the mold back during the curing operation. The sector tooling is attached to the mold back and to the mold sector using numerous screws or bolts.

In order to move the mold sectors or add more mold sectors the mold must be removed from service, disassembled and undergo a re-machining process to move the sector tooling. Essentially, the sector tooling 28 is permanently placed in the mold, limiting the tire size and tread pattern produced from that mold.

Embodiments of the present invention provide an apparatus for adjusting the placement of mold sectors and quickly connecting and disconnecting the mold sector from the mold back. These embodiments solve the problem of molds being dedicated to a particular tire size and reduce the time and labor necessary to change tread patterns.

Figure 3:
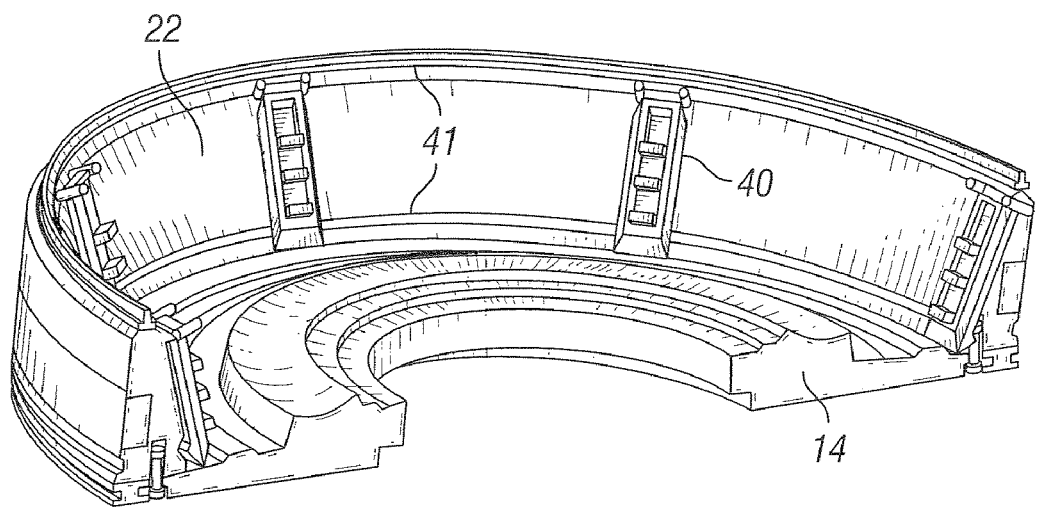
FIG. 3 is a partial section view of a tire mold in accordance with the invention.

FIG. 3 illustrates an embodiment of the present invention where the mold back 22 has at least one circumferential groove 41. In another embodiment two grooves 41 are machined into the mold back 22. The groove or grooves 41 may be a dovetail, T-slot or any other design known to those of ordinary skill in the art that complements the clamping mechanism 50 on the frame 44.

Figure 4:
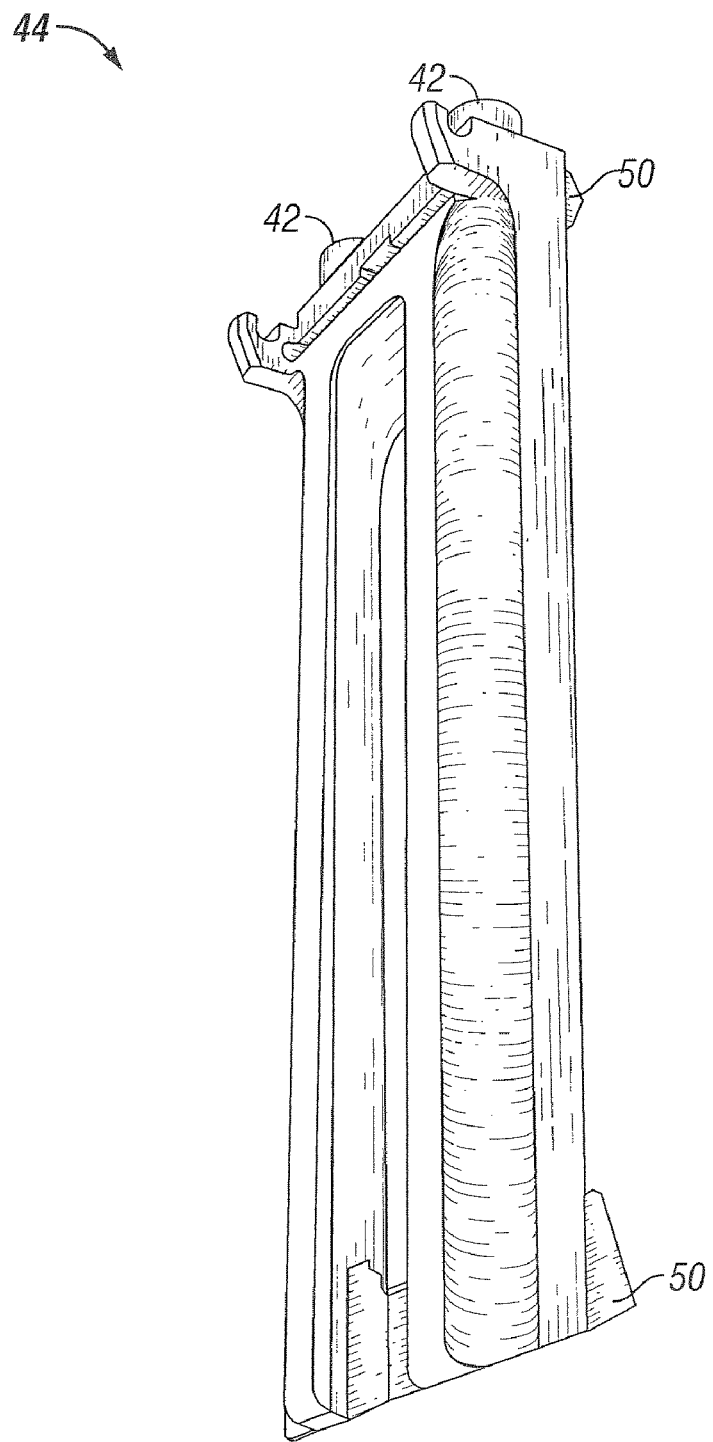
FIG. 4 is a perspective view of the frame portion of the tooling.

FIG. 4 illustrates an embodiment of the frame 44. The frame 44 slides on the grooves 41 to be positionable in azimuth around the mold back 22. The frame 44 may be positioned on the mold back 22 without removing it from the grooves 41.

In an embodiment the frame 44 directly attaches to the mold back 22 utilizing a clamping mechanism 50 on the top and the bottom back side of the frame 44. In a particular embodiment the clamping mechanism 50 is fixed to the bottom back side of the frame 44 and another clamping mechanism 50 is fixed to an adjustable plate on the top of the frame 44. The clamping mechanism allows the frame to freely slide on a groove 41 in the mold back 22 and be positionable in azimuth around the mold back 22. In one embodiment of the present invention hook shaped clamps are used on the top and bottom as the clamping mechanism 50. Other apparatus may be contemplated for use as the clamping mechanism, such as, for example one or more dovetail joints, T slots or any other apparatus that allows the frame to freely slide on a groove.

In one embodiment at least one fastener 42 located on the top of the frame is used to create the clamping force on the clamping mechanism 50 to fix the position of the frame 44 on the mold back. In a particular embodiment the adjustable plate is tightened with at least one fastener 42 to create the clamping force on the frame 44. In another embodiment two fasteners 42 are positioned on the top of the frame in conjunction with an adjustable plate to create the clamping force on the clamping mechanism 50. The clamping force may be created by using fasteners such as, for example, any type of screw, cams, toggle clamps and the like.

The ability of the tooling to slide allows the tooling to be located at any position and to be easily changed from one configuration to another. In this manner a single mold back 22 and tooling 40 allow the mold to produce different tire sizes. The ease of positioning the tooling requires minimal production down time. A second significant advantage is that the position of the tooling may be altered without removing the mold from the press. The tooling slides around the mold back to the appropriate position. When in the appropriate position as determined by the number of sectors required for the tire size, the tooling is fixed or locked into position onto the mold back with at least one fastener.

Figure 5:
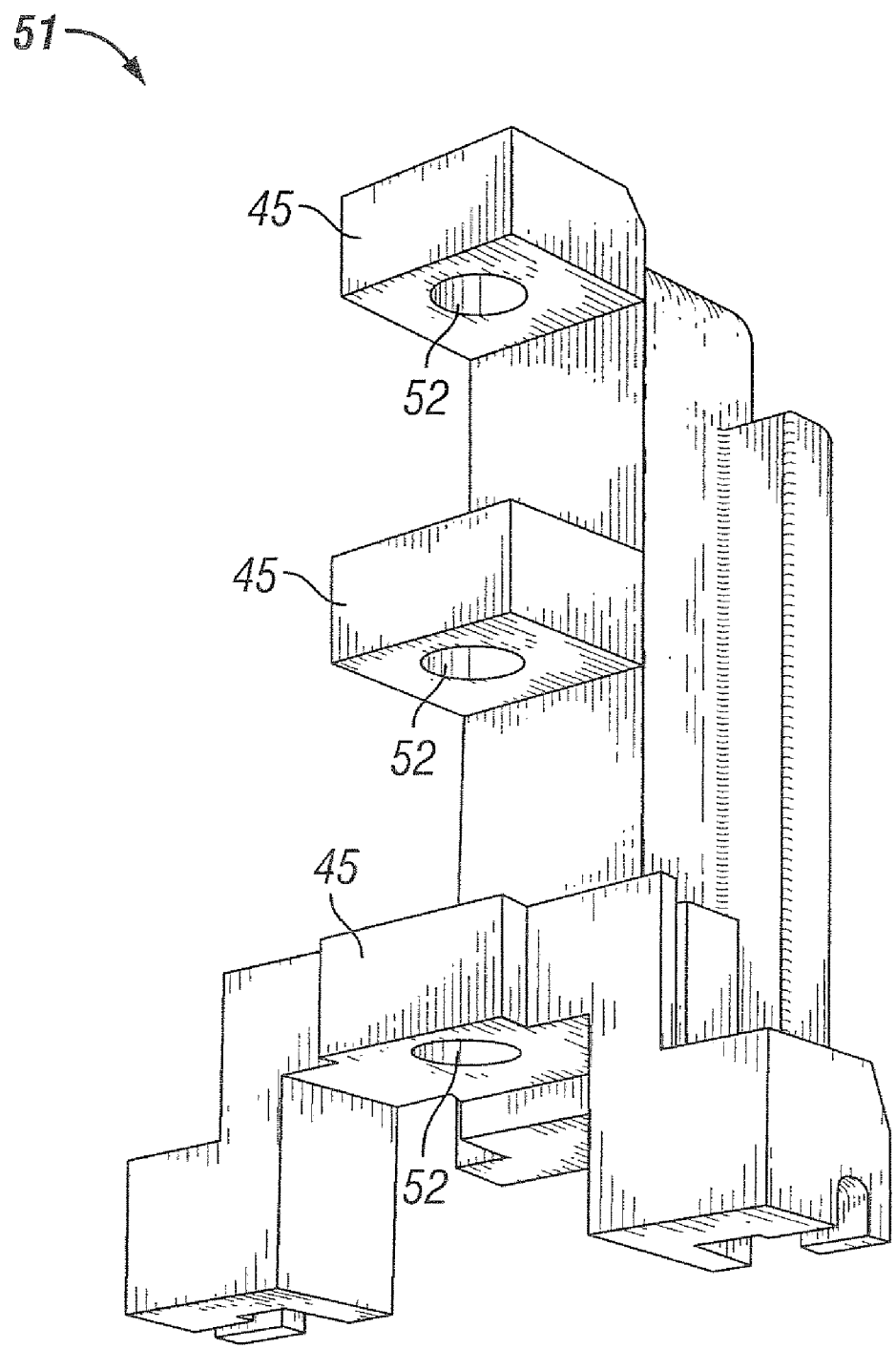
FIG. 5 is a perspective view of the slide assembly of the tooling.
Figure 6:
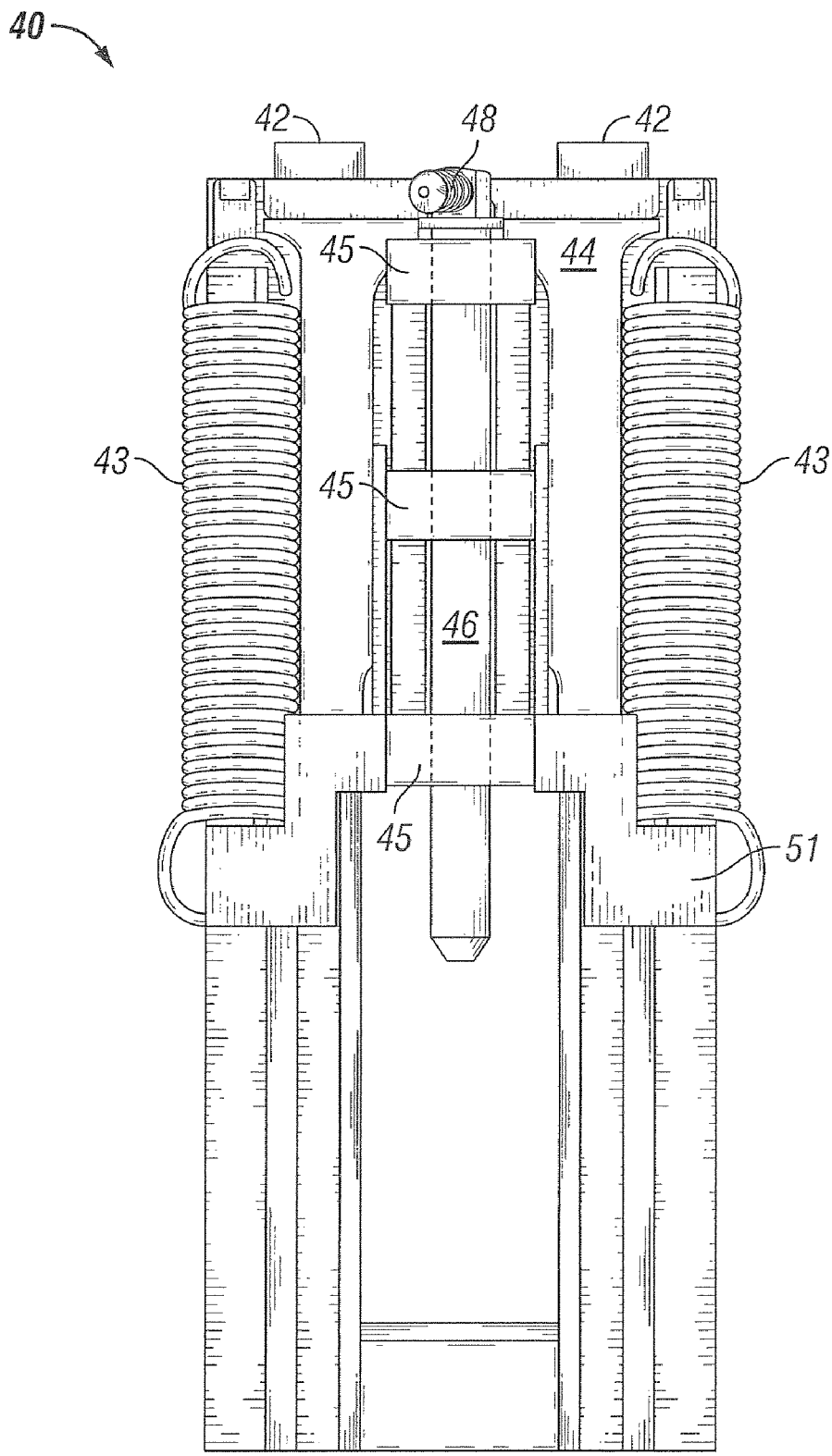
FIG. 6 is a front elevation view of the tooling of the mold of FIG. 3.

FIGS. 5 and 6 illustrate another portion of the tooling 40 comprising a slide assembly 51 slidably engaged on the frame 44. In one embodiment the frame 44 has two vertical channels that engage the tabs on the back portion of the slide assembly. An embodiment of the slide assembly comprises a plurality of slide steps arranged vertically along the length of the slide assembly as shown in FIG. 5. Each slide step has a hole therethrough forming an open column from the top of the slide assembly through the bottom of the slide assembly. In one embodiment slide steps have coaxial holes.

A biasing mechanism positions the slide assembly on the frame holding the slide assembly at levels of engagement with the frame 44. In one embodiment two springs are attached at one end to the frame 44 and at the other end to the slide assembly 51. The springs 43 hold the slide assembly 51 at the top of the frame 44 during mold opening and closing. The biasing mechanism may be any mechanism capable of being extended or compressed to provide the force for biasing the position of the slide assembly relative to the frame. Examples of suitable biasing means would be known to a person skilled in the art and these would include various springs such as coiled springs.

Another embodiment of the present invention comprises an attaching mechanism for attaching the slide assembly 51 to the mold sector 18. The attaching mechanism could be a bracket, screws, bolts, clamps, a pin or equivalents. A particular embodiment of the attaching mechanism, as shown in FIG. 6 comprises slide steps 45 with holes 52 therethrough and a pin 46 capable of being inserted through the holes 52 of the slide steps 45. The dimensions of the holes 52 and pin 46 are not critical to the alignment of the mold sectors 18. The mold sectors align at the lateral edges of the sectors.

Figure 7:
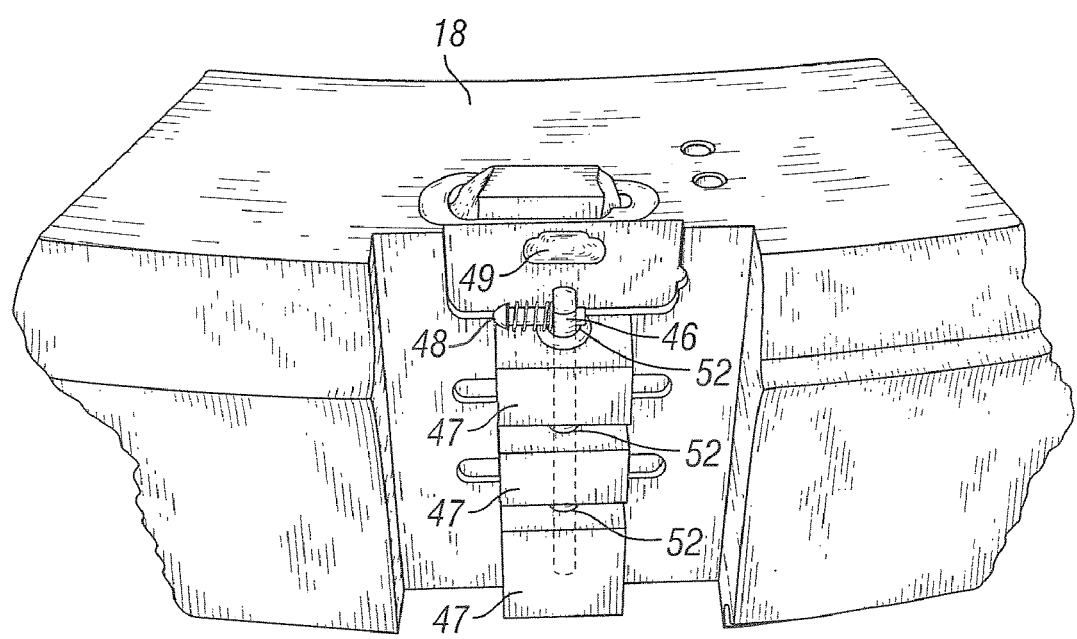
FIG. 7 is a front elevation view of a mold sector in accordance with the invention.

FIGS. 6 and 7 illustrate the tooling apparatus and a mold sector 18 according to an embodiment of the present invention. In one embodiment the slide assembly 51 attaches the tooling 40 to the mold sector 18 using the interlocking steps 45, 47 of the slide assembly 51 and the mold sector 18 and a pin 46 as the attaching mechanism. The interlocking steps are a plurality of slide steps 45 with holes 52 therethrough and a plurality of sector steps 47 with holes therethrough. In one embodiment a plurality of sector steps 47 is machined into the mold sector. Alternatively, the sector steps could be brackets rigidly fixed to the mold sector 18. The mold sector 18 and the slide assembly 51 are in mutual alignment to form a continuous open column in the slide steps 45 and the sector steps 47. These sector steps 47 complement the slide steps 45 meaning that the two sets of steps alternately stack together creating a column of interlocking steps with coaxial holes in the steps. The pin 46 slides downward through coaxial holes 52 in the steps, securing the slide steps 45 and the sector steps 47.

The interlocking steps and pin 46 create a quick connection between the tooling 40 and the mold sector 18. This quick connection provides for easy changing of tread patterns by simply replacing the existing mold sectors with the new tread pattern mold sectors. This exchange of mold sectors may take place while the mold is housed in the curing press.

In an embodiment a locking mechanism secures the tooling to the mold sector. In a particular embodiment a spring loaded post 48 through the top of the pin 46 provides a locking mechanism for securing the tooling 40 to the mold sector 18. The spring loaded post 48 seats in the receiving slot 49 on the mold sector 18 to lock the tooling 40 onto the mold sector 18.

Another embodiment of the present invention includes a method for using the tooling for making a tire. The method comprises selecting the number of mold sectors needed for a specific tire size, positioning a plurality of tooling around a mold back to accommodate the number of sectors required for the tire size, fixing the position of the tooling to the mold back with a fastener, attaching the sectors on the tooling and locking the mold sector on the tooling apparatus.

The step of positioning a plurality of tooling further comprises slipping the clamping mechanism onto the grooves in the mold back and sliding the tooling around the mold back on the grooves. The method further includes locking the tooling to the mold sector.

The step of locking the mold sector on the tooling apparatus further comprises inserting a pin through a plurality of slide steps and a plurality of sector steps.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A molding apparatus comprising:
   a mold back;
   at least one circumferential groove in the mold back;
   a frame slidably engaged with the at least one groove on the mold back;
   a clamping mechanism for securing the frame to the mold back;
   at least one fastener positioned on the frame for providing a clamping force to the clamping mechanism for fixing the frame in position on the mold back;
   a slide assembly slidably engaged with the frame;
   a biasing mechanism for positioning the slide assembly with the frame; and
   an attaching mechanism for attaching the slide assembly to a mold sector.

2. The molding apparatus of claim 1, wherein the clamping mechanism further comprises a fixed portion on a bottom of the frame and an adjustable plate at a top of the frame.

3. The molding apparatus of claim 2, wherein the clamping mechanism is a hook shaped clamp at each of a top end and a bottom end of the frame securing the frame to the mold back so as to be positionable on the mold back.

4. The molding apparatus of claim 1, wherein the frame is positionable in azimuth around the mold back.

5. The molding apparatus of claim 4, wherein the frame is positionable while engaged with the mold back.

6. The molding apparatus of claim 1, wherein two fasteners are positioned on a top of the frame in conjunction with an adjustable plate to provide the clamping force to the clamping mechanism for fixing the frame inposition on the mold back.

7. The molding apparatus of claim 1, wherein the slide assembly further comprises a plurality of slide steps, arranged along the length of the slide assembly.

8. The molding apparatus of claim 1, wherein the biasing mechanism is a pair of springs.

9. The molding apparatus of claim 1, wherein the attaching mechanism further comprises a plurality of slide steps having a set of holes therethrough and a pin capable of being inserted through the set of holes.

10. The molding apparatus of claim 1, wherein the frame is slidably engaged within two grooves machined in the mold back.

11. The mold of claim 1, wherein the biasing mechanism holds the slide assembly at a top of the frame during mold opening and closing.

12. A mold comprising:
   a mold back;
   at least one circumferential groove in the mold back;
   a frame slidably engaged with the at least one groove on the mold back;
   a clamping mechanism for securing the frame to the mold back;
   at least one fastener positioned on the frame for providing a clamping force to the clamping mechanism for fixing the frame in position on the mold back to receive a mold sector;
   a slide assembly having a plurality of slide steps, wherein the slide assembly is slidably engaged with the frame;
   a biasing mechanism for engaging the slide assembly with the frame;
   an attaching mechanism for attaching the slide assembly to the mold sector; and
   a plurality of sector steps on each mold sector.

13. The mold of claim 12, wherein the clamping mechanism further comprises a fixed portion on a bottom of the frame and an adjustable plate at a top of the frame.

14. The mold of claim 12, wherein the clamping mechanism is a hook shaped clamp at each of a top end and a bottom end of the frame securing the frame to the mold back so as to be positionable on the mold back.

15. The mold of claim 12, wherein the frame is positionable in azimuth around the mold back while engaged with the mold back.

16. The mold of claim 12, wherein two fasteners are positioned on a top of the frame in conjunction with an adjustable plate to provide the clamping force to the clamping mechanism for fixing the frame in position on the mold back.

17. The mold of claim 12, wherein the mold sector and the slide assembly are in mutual alignment to form a continuous open column in the plurality of slide steps and the plurality of sector steps.

18. The mold of claim 12, wherein the biasing mechanism is a pair of springs.

19. The mold of claim 12, wherein the attaching mechanism further comprises the plurality of slide steps with a set of holes therethrough, the plurality of sector steps with a set of holes therethrough and a pin capable of being inserted through the sets of holes.

20. The mold of claim 12, wherein the frame is slidably engaged within two grooves machined in the mold back.

21. The mold of claim 19, further comprising a locking mechanism for locking the attaching mechanism to the mold sector, wherein the pin comprises a spring loaded post at a top of the pin and a receiving slot on the mold sector for receiving the spring loaded post.

22. The mold of claim 12, wherein the biasing mechanism holds the slide assembly at a top of the frame during mold opening and closing.

\* \* \* \* \*